United States Patent [19]
Hunger et al.

[11] 3,980,635
[45] Sept. 14, 1976

[54] NOVEL FORM OF THE DISAZO PIGMENT FROM BISDIAZOTIZED 3,3'-DICHLOROBENZIDINE AND 1-(P-TOLYL)-3-METHYLPYRAZOL-5-ONE

[75] Inventors: Klaus Hunger, Kelkheim, Taunus; Joachim Ribka, Offenbach, Main; Wolfgang Rieper, Frankfurt am Main, all of Germany

[73] Assignee: Hoechst Aktiengesellschaft, Frankfurt am Main, Germany

[22] Filed: Sept. 24, 1975

[21] Appl. No.: 616,250

Related U.S. Application Data

[63] Continuation of Ser. No. 434,038, Jan. 17, 1974, abandoned.

[30] Foreign Application Priority Data

Jan. 19, 1973  Germany............................ 2302482

[52] U.S. Cl................................ 260/161; 260/208; 106/288 Q
[51] Int. Cl.$^2$.......................................... C09B 43/00
[58] Field of Search........................... 260/161, 208; 106/288 Q

[56] References Cited
UNITED STATES PATENTS

| | | | |
|---|---|---|---|
| 3,124,565 | 3/1964 | Schilling et al. | 260/157 |
| 3,127,412 | 3/1964 | Gaertner et al. | 260/314.5 |
| 3,137,686 | 6/1964 | Dietz et al. | 260/157 |
| 3,567,707 | 3/1971 | Neave et al. | 260/161 |

FOREIGN PATENTS OR APPLICATIONS

| | | | |
|---|---|---|---|
| 236,856 | 9/1910 | Germany | 260/161 |

OTHER PUBLICATIONS
Colour Index, Third Ed., vol. 3, 1971, p. 3295.
Colour Index, Third Ed., vol. 4, 1971, p. 4155.
Wincke, Farbe Undlack, vol. 75, 1969, pp. 632–637.

*Primary Examiner*—Charles F. Warren
*Attorney, Agent, or Firm*—Curtis, Morris & Safford

[57] ABSTRACT

A highly covering disazo pigment having the chemical constitution

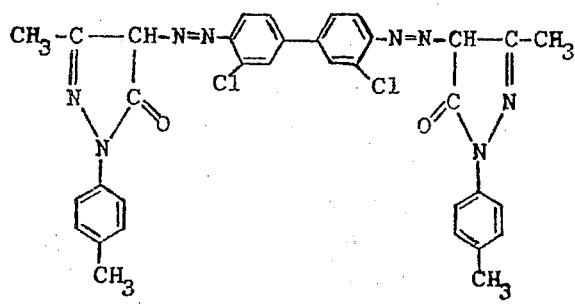

which is characterized by a specific surface of 12 – 30, preferably 15 to 25, m$^2$/g, a maximum of the grain size distribution of between 250 and 500 nm and a proportion of these grain sizes in the total distribution of 35 – 65 percent, preferably 45 – 60 percent. This new pigment form is obtained by heating the pigment obtained after coupling with a solvent which is immiscible with water or miscible with water to a limited degree only to temperatures above 100°C.

1 Claim, No Drawings

NOVEL FORM OF THE DISAZO PIGMENT FROM BISDIAZOTIZED 3,3'-DICHLOROBENZIDINE AND 1-(P-TOLYL)-3-METHYLPYRAZOL-5-ONE

This is a continuation, of application Ser. No. 434,038, filed Jan. 17, 1974, and now abandoned.

The present invention relates to a disazo pigment, to a process for preparing it and to its use.

German Pat. DRP 236.856 describes disazo pigments of the general formula

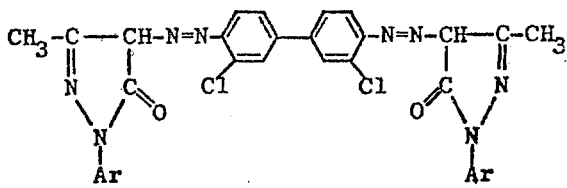

The products obtained by the reaction of bis-diazotized 3,3'-dichlorobenzidine with 2 equivalents of 1-aryl-3-methylpyrazolone-(5) in a buffered acid medium are transparent and are suitable especially as printing dyes. The use of the pigments in lacquers for full tone lacquerings is uninteresting, because of the high binder absorption which is due to the high proportion of finest grains. This high binder absorption permits pigment concentrations of at most 5 percent in the lacquer. Higher concentrations give highly viscous pastes of poor fluidity, which can hardly be worked and which yield stove lacquerings without surface luster. The same applies to the pigment obtained from bis-diazotized 3,3'-dichloro-benzidine and 2 equivalents of 1-(p-tolyl)-3-methyl-pyrazolone-(5) in a strongly hydrochloric medium (U.S. Pat. No. 3.567.707). This pigment has a specific surface of 40 – 60 m²/g and less than 35 percent of the pigment particles are in the size range of between 250 – 500 nm.

Now, we have found a highly covering disazo pigment having the chemical constitution

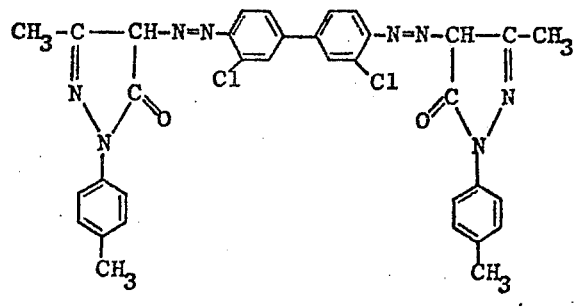

which is characterized by a specific surface of 12 – 30, preferably 15 to 25, m²/g, a maximum of the grain size distribution of between 250 and 500 nm and a proportion of these grain sizes in the total distribution of 35 – 65 percent, preferably 45 – 60 percent.

This new pigment form is obtained by heating the pigment obtained after coupling with a solvent which is immiscible with water or miscible with water to a limited degree only to temperatures above 100° C. For this purpose, the pigment suspension obtained after the synthesis is combined with the organic solvent or the wet press cake, which has been filtered off and washed until free from salt or the dry crude pigment is suspended in a mixture of water and an organic solvent which is immiscible with water or miscible with water to a limited degree.

The content of pigment in this suspension is in the range of from about 2 to 10, preferably 5 to 8, percent by weight. The proportion of organic solvent in the total quantity of liquid is in the range of between 10 and 100 percent by weight. It is preferred to use a mixture which consists of about equal parts of water and organic solvent.

This suspension is heated for some time to temperatures above 100° C, preferably to temperatures in the range of from 120° to 180° C. The time of this heat treatment depends on the temperature chosen and on the organic solvent. The higher the temperature and the more solvent is used, the shorter is the time required. In general, the treatment times are between about 10 minutes and 8 hours. The reaction conditions required for obtaining optimum covering power can be determined, for example by preliminary tests on a reduced factorial scale.

As organic solvents which are not miscible with water or miscible with water to a limited degree only, there may be used in particular chlorobenzene and other halogenated aromatic compounds, for example o-dichlorobenzene, or also higher alcohols of 4 – 8 carbon atoms, for example isobutanol, aromatic nitrocompounds such as nitrobenzene, aromatic amines such as aniline, aromatic ethers such as anisole or phenetol, esters of aromatic acids, for example benzoic acid methyl or ethyl ester, and ketones such as methyl-iso-butyl ketone or methyl-iso-propyl ketone. The term "not miscible with water to an illimited degree" refers to those solvents whereof 20 g at maximum are miscible with 100 g of water.

Isolation of the pigment so treated is preferably carried out by filtration from the aqueous suspension, after having distilled off the organic solvent with the aid of steam.

The distribution of the particle size was determined according to the method described by C. E. Marshall in "Proceedings of the Royal Society," London A 126, page 427 (1936). The specific surface was measured according to the method described by R. Haul, G. Dumbgen in Chem. Ing. Tech. Vol. 35, page 586 (1963).

The new pigment form is especially suited for the pigmentation of stove lacquers, plastics and special printing pastes, for example for the printing of sheet metal. The materials dyed with this pigment form show an essentially improved covering power and an increased fastness to light when compared to that obtained with untreated pigments. Stove lacquers on the basis of this new form of pigment show a good luster and a good fluidity, even if they are highly pigmented.

The following Examples illustrate the invention:

EXAMPLE 1:

An aqueous suspension of the coupling product of 3,3'-dichlorobenzidine and 2 equivalents of 1-(p-tolyl)-3-methyl-pyrazolone-(5) was filtered and the pigment press cake was washed until neutral and free from salt. 200 g of the about 25 percent aqueous dyestuff paste so obtained were suspended in 200 ml of water and after addition of 400 ml of chlorobenzene the suspension was heated for 4 hours in a closed vessel to 150° C. After cooling to 90°C, the chlorobenzene was distilled off by introduction of steam and the pigment was filtered off from the remaining aqueous suspension. The dried and ground dyestuff had a specific surface of 23.3 m²/g. 53 percent of all pigment particles had an average diameter of between 250 and 500 nm. When incorporating 10 percent by weight of this pigment into an alkyd-melamine resin clear lacquer in a paint shaker, coating the resulting pigmented lacquer on test cards with black ground and stoving the cards for 30 minutes at 140° C, lacquerings with very high covering power, good flow and high luster were obtained. The lacquerings were distinguished by a very good fastness to light.

EXAMPLE 2:

200 g of the about 25 percent aqueous pigment paste obtained according to Example 1 were suspended in 800 ml of isobutanol and the suspension was heated for 8 hours to 150° C in a closed vessel. After cooling to 80° C and addition to 350 ml of water, the isobutanol was distilled off by introduction of steam and the pigment was filtered off from the remaining aqueous suspension. The dried and ground dyestuff had a similarly high covering power and good properties regarding application as the product obtained according to Example 1.

We claim:

1. A disazo pigment of the formula

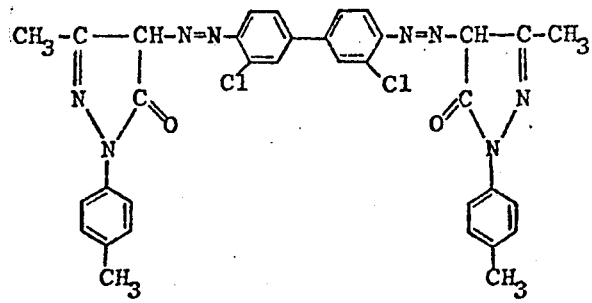

characterized by a specific surface of 12–30 m²/g, a maximum of the grain size distribution of between 250 and 500 nm and a proportion of these grain sizes in the total distribution of 35–65 percent.

* * * * *